UNITED STATES PATENT OFFICE.

HALVOR HALVORSON, OF NASHUA, NEW HAMPSHIRE.

DESICCATING EGGS.

SPECIFICATION forming part of Letters Patent No. 233,750, dated October 26, 1880.

Application filed April 9, 1880. (No specimens.)

*To all whom it may concern:*

Be it known that I, HALVOR HALVORSON, of Nashua, in the county of Hillsborough and State of New Hampshire, have invented certain Improvements in Desiccating Eggs, of which the following is a specification.

My invention depends, in the main, upon the application of two principles, both of which have been discovered by me, and have been first applied by me as herein described. The first of these is based upon the fact that the albumen from eggs, coagulated by heat, is soluble in an excess of raw albumen, whereby the effect of the heat upon it is neutralized. The second is based upon the fact that where a dried and powdered nucleus composed of boiled eggs is employed a much larger quantity of raw eggs may be desiccated upon the said nucleus by intimately mixing all together.

In order that my improved method may be the more fully understood, I will describe it in detail.

I boil or otherwise cook one dozen eggs until their yelks and whites are hard, and then dry and finely pulverize them. This mass I employ as a nucleus upon which to desiccate, say, eight dozen or more raw eggs. These latter are first beaten, and then enough of them is added to the already-dried nucleus to form, when kneaded therewith, a sort of doughy mass, which should be spread on screens to dry. When dried it is powdered and another portion of the raw and beaten egg added until it forms a doughy mass, which, in turn, is dried and powdered, as before stated. Thus the raw egg may be added by installments to the previously-dried nucleus and its increments until all is desiccated. This operation may be repeated a great number of times without the necessity of renewing the nucleus of boiled eggs, and the product will thus consist almost wholly of raw egg. I have repeated these additions seven or eight times without being able to discover the slightest change or deterioration in the nucleus, which must, of course, have been wet and dried that number of times.

As the proportion of coagulated albumen employed as a nucleus is quite small, it is completely dissolved by the excess of raw albumen mixed with it, and the desiccated product may, by the simple addition of water, be employed for any of the purposes for which fresh raw eggs are adapted, except in cases where the whites are to be employed separately from the yelks. For such purposes I can and do desiccate each separately upon nuclei composed alone of the whites or yelks, as the case may be.

This mode of separate desiccation does not require any departure from that above described.

The desiccated product prepared as above described may be granulated or powdered, as desired, and put up, for sale, in packages suited to the trade or the wants of consumers.

I am fully aware that it is not new to desiccate either cooked or raw eggs, and I make no claim to this.

Films of raw-egg batter have been dried on plates or disks, and partially-dried egg-batter has been pressed into solid blocks. Milk has also been mixed with farinaceous substances, and the compound dried. I make no claim herein to any of these, however. My invention relates to a new method of desiccating eggs, in which a small quantity of cooked egg is made to serve as a nucleus on which to dry quantities of raw egg, and the albumen of the cooked egg being dissolved by the uncooked albumen, the dried mass becomes virtually uncooked.

Having thus described my invention, I claim—

The method of desiccating eggs herein described, which consists in cooking, drying, and pulverizing the whites or yelks of eggs, or both, and then mixing with said dried mass, as a nucleus, raw beaten whites or yelks of eggs, or both, then mixing or kneading the mass, and then drying and pulverizing the same, substantially as set forth.

In witness whereof I have hereunto signed my name in the presence of two subscribing witnesses.

HALVOR HALVORSON.

Witnesses:
J. FRANK ACKERMAN,
G. H. BURBUNK.